(12) United States Patent
Chang

(10) Patent No.: US 6,623,134 B1
(45) Date of Patent: Sep. 23, 2003

(54) LIGHT-EMITTING STRUCTURES OF AN AUTOMOTIVE EXHAUST TAILPIPE, MUFFLER, OR THE LIKE

(75) Inventor: Ming-Tien Chang, Nan Tou (TW)

(73) Assignee: Sound Ware Industry Co., Ltd., Chang Hua Hsien (TW)

(*) Notice: Subject to any disclaimer, the term of this patent is extended or adjusted under 35 U.S.C. 154(b) by 30 days.

(21) Appl. No.: 10/036,355

(22) Filed: Jan. 4, 2002

(51) Int. Cl.[7] .............................................. F21V 33/00
(52) U.S. Cl. ...................... 362/96; 362/487; 362/545; 362/494; 362/547; 313/47
(58) Field of Search .................... 362/96, 487, 545, 362/505, 506, 294, 373, 547; 165/104.33; 313/47

(56) References Cited

U.S. PATENT DOCUMENTS 3,659,131 A * 4/1972 Beggs ........................ 313/11
5,857,767 A * 1/1999 Hochstein ................... 362/294
6,471,377 B1 * 10/2002 Stegall ........................ 362/487

FOREIGN PATENT DOCUMENTS

JP 2000159005 A * 6/2000 ............ B60Q/1/30

* cited by examiner

*Primary Examiner*—Sandra O'Shea
*Assistant Examiner*—Ali Alavi
(74) *Attorney, Agent, or Firm*—Harrison & Egbert

(57) ABSTRACT

A light-emitting structure of the automotive exhaust tailpipe includes an outer tubular member which is fitted over the exhaust tailpipe and is provided with an inner tubular member fitted thereinto along with a first retaining member. A second retaining member is fitted over the inner tubular member such that a receiving space is formed between the first retaining member and a second retaining member for receiving a heat-resistant piece. The second retaining member is provided with a plurality of light bulb sockets. The automotive exhaust tailpipe is thus provided with a light-emitting effect to reinforce the warning effect of the tail lights of the motor vehicle.

4 Claims, 3 Drawing Sheets

LIGHT-EMITTING STRUCTURES OF AN AUTOMOTIVE EXHAUST TAILPIPE, MUFFLER, OR THE LIKE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a light-emitting structure, and more particularly to a light-emitting structure of automotive parts, such as exhaust tailpipe, muffler, or the like, for reinforcing the warning effect of tail lights of the motor vehicle.

BACKGROUND OF THE INVENTION

The motor vehicle is provided at the rear thereof with tail lights to warn the vehicles approaching from behind. In view of the fact that the warning effect of the tail lights is not sufficient, the exhaust tailpipe is provided with a light-emitting structure serving to reinforce the warning effect of the tail lights. However, there is a technical problem involving the addition of the light-emitting structure to the automotive exhaust tailpipe through which the extremely hot fumes are discharged. In other words, the light emitting structure must be provided with an effective heat insulation to prolong the service life span of the light-emitting structure of the automotive exhaust tailpipe.

BRIEF SUMMARY OF THE INVENTION

The primary objective of the present invention is to provide an automotive exhaust tailpipe or the like with a light-emitting structure comprising an inner tubular member, an outer tubular member, a heat resistant member, and a light-emitting set which is held by the heat resistant member such that the light-emitting set is located at the discharge end of the automotive exhaust tailpipe.

The features and the advantages of the present invention will be more readily understood upon a thoughtful deliberation of the following detailed description of the present invention with reference to the accompanying drawings.

DETAILED DESCRIPTION OF THE INVENTION

The light-emitting structure of the present invention is intended for use along with an automotive exhaust tailpipe, muffler, or the like.

Figure 1:
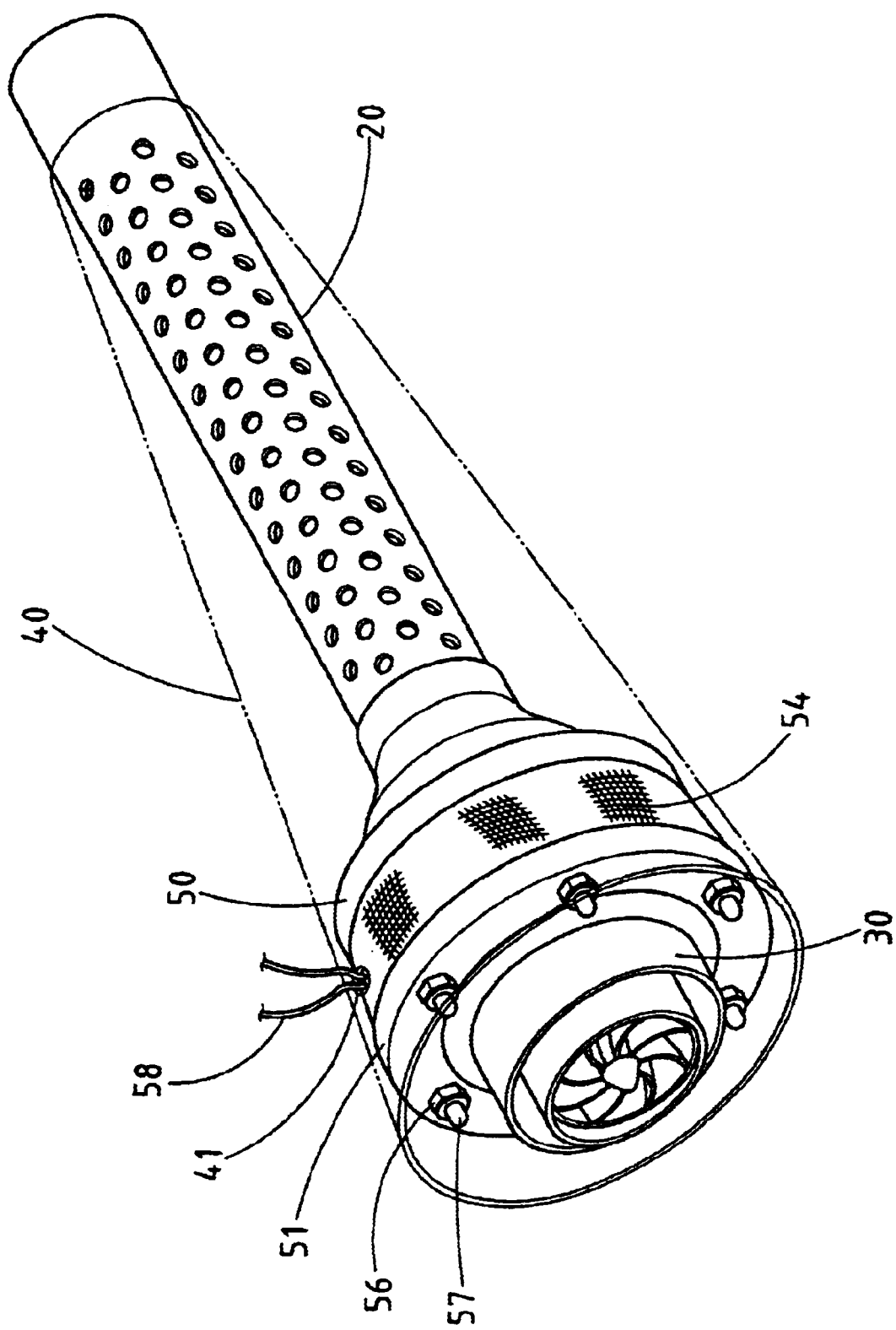
FIG. 1 shows a perspective view of a preferred embodiment of the present invention
Figure 2:
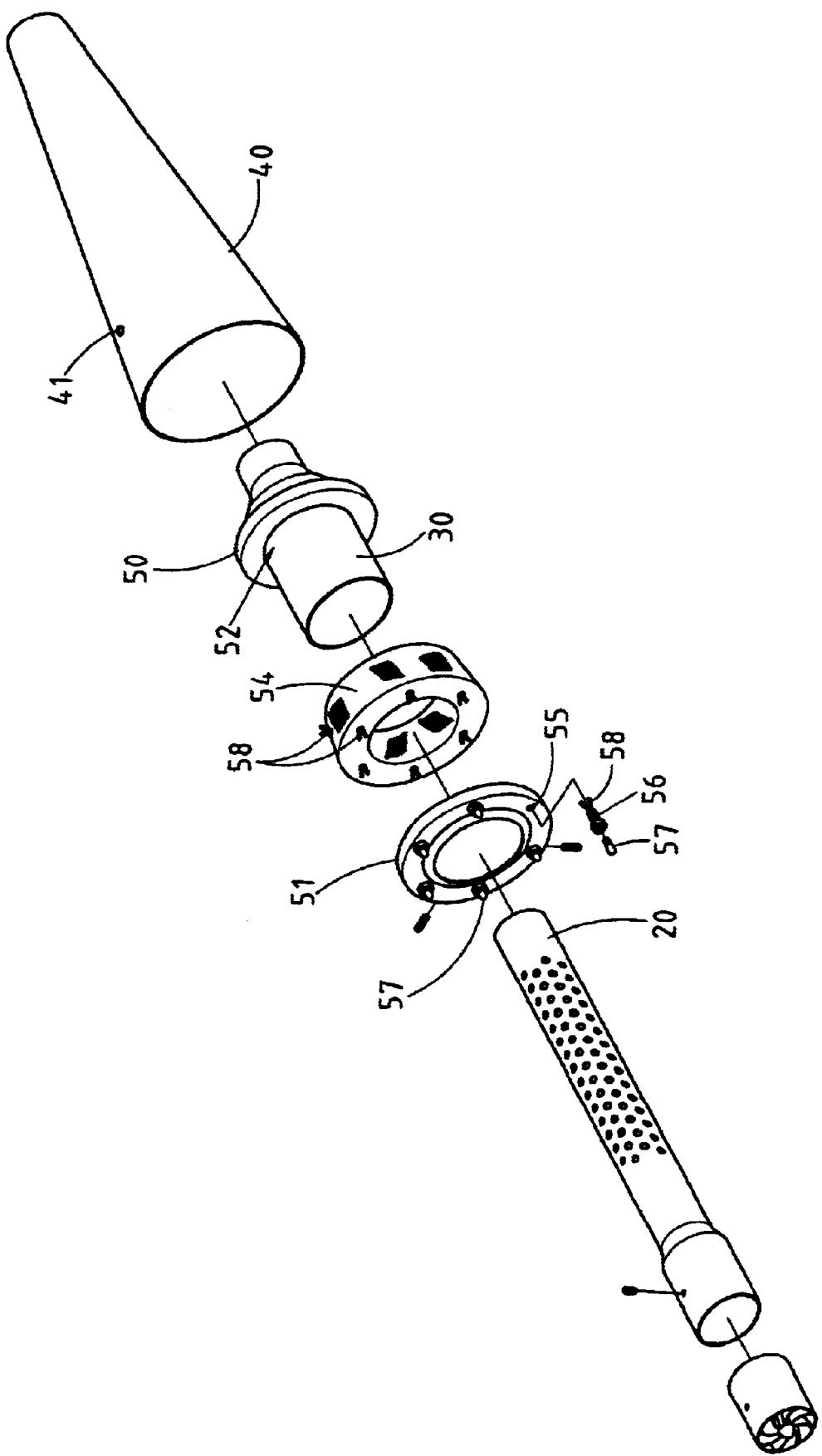
FIG. 2 shows an exploded perspective view of the preferred embodiment of the present invention.
Figure 3:
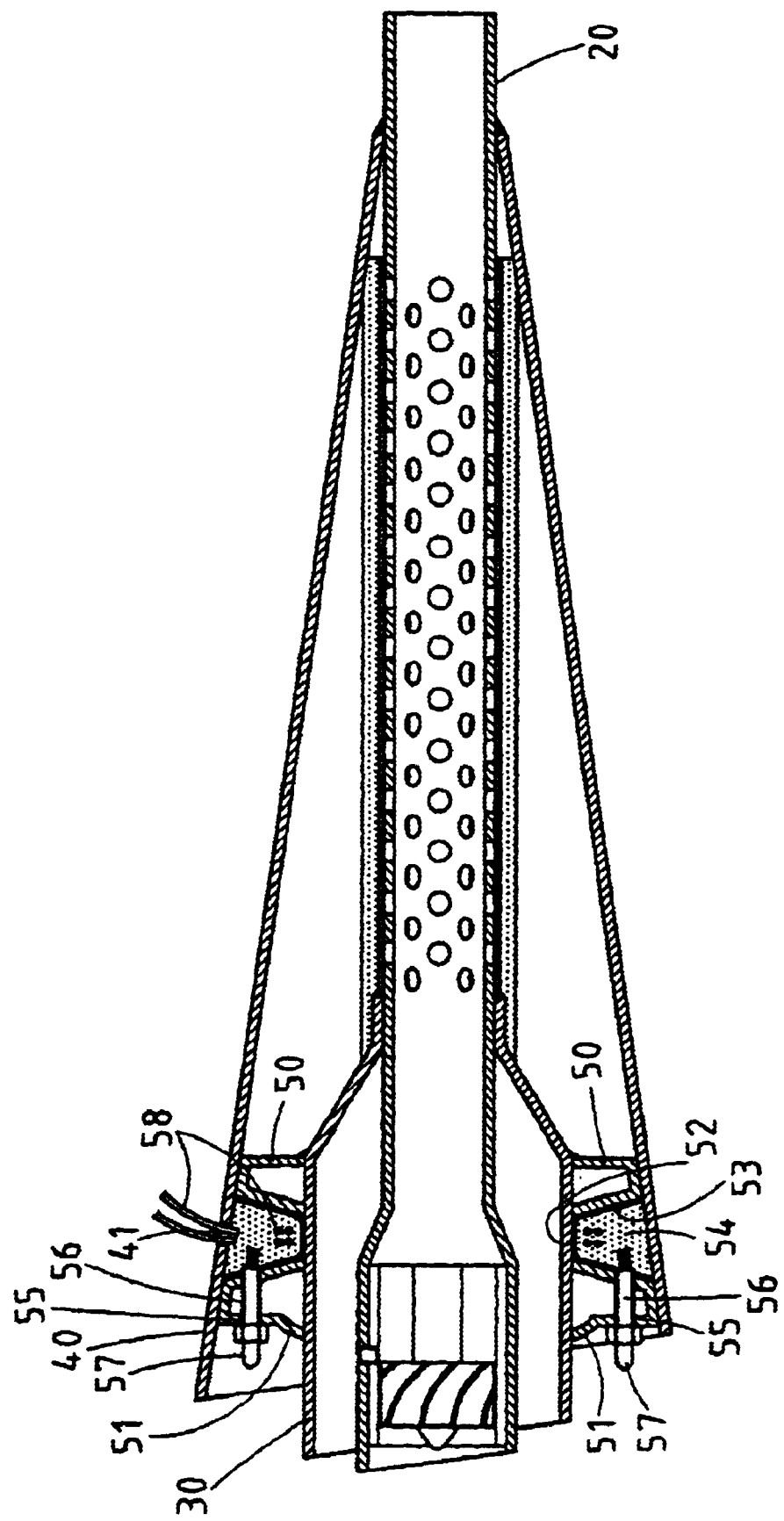
FIG. 3 shows a longitudinal sectional view of the preferred embodiment of the present invention.

As shown in FIGS. 1–3, a light-emitting structure embodied in the present invention comprises an automotive exhaust tailpipe 20, an inner tubular member 30, an outer tubular member 40, a first retaining member 50, a second retaining member 51, and a plurality of light bulbs 57.

The outer tubular member 40 has a tapered shape, and a front end which corresponds in location to a discharge end of the exhaust tailpipe 20 and is provided with a wire hole 41. The inner tubular member 30 is fitted into a first retaining member 50 which is fitted securely into the front end of the outer tubular member 40. The second retaining member 51 is fitted over the inner tubular member 30 such that a receiving space 52 is formed between the first retaining member 50 and a second retaining member 51. The walls of the receiving space 52 are coated with a heat-resistant ceramic layer 53. The receiving space 52 is used to hold a heat-resistant piece 54 which is made of ceramic fiber and is provided with a plurality of bonding wires 58. The second retaining member 51 is provided with a plurality of threaded holes 55 for fastening a plurality of light bulb sockets 56. The light bulb sockets 56 are provided with a light bulb 57 and a bonding wire 58 which is connected with one of the bonding wires 58 of the heat-resistant piece 54. The bonding wire 58 is connected with a bonding wire of the tail lights via the wire hole 41 of the front end of the outer tubular member 40.

The advantages of the present invention are readily apparent. The present invention is resistant to heat, thanks to the ceramic coatings 53 of the receiving space 52 which is formed jointly by the first retaining member 50 and the second retaining member 51, and the heat resistant piece 54 which is made of a ceramic fiber material.

The embodiment of the present invention described above is to be regarded in all respects as being merely illustrative and not restrictive. Accordingly, the present invention may be embodied in other specific forms without deviating from the spirit thereof. For example, the present invention may comprise an electronic controller (not shown in the drawings) which is connected with the bonding wires 58 of the light bulb sockets 56 for bringing about a specific light-emitting pattern so as to enhance the warning effect. The present invention is therefore to be limited only by the scope of the following claims.

I claim:

1. A light-emitting structure comprising:
   an automotive exhaust tailpipe having a discharge end;
   an outer tubular member fitted over said exhaust tailpipe such that an end of said outer tubular member is adjacent said discharge end of said exhaust tailpipe, said outer tubular member having a opposite end with a wire hold formed therein;
   an inner tubular member;
   a first retaining member fitted over said inner tubular member, said first retaining member fitted into said opposite end of said outer tubular member;
   a second retaining member fitted over said inner tubular member so as to define a receiving space between said first retaining member and said second retaining member, said receiving space having a heat-resistant coating and a heat-resistant piece mounted therein, said heat-resistant piece having a plurality of bonding wires, said second retaining member having a plurality of threaded holes formed therein;
   a plurality of light bulb sockets fastened respectively to said plurality of threaded holes, each of said plurality of light bulb sockets having a bonding wire extending therefrom, the bonding wire of the light bulb socket connected to a respective bonding wire of said plurality of bonding wires of said heat-resistant piece; and a plurality of light bulbs respectively received within said plurality of light bulb sockets.

2. The light-emitting structure of claim 1, said heat-resistant coating being a ceramic coating.

3. The light-emitting structure of claim 1, said heat-resistant piece being a ceramic fiber material.

4. The light-emitting structure of claim 1, further comprising:

an electronic controlling means connected to the light bulb socket, said controlling means for generating a desired light-emitting pattern for light from said plurality of light bulbs.

\* \* \* \* \*